US 6,612,258 B2

(12) United States Patent
Isman et al.

(10) Patent No.: US 6,612,258 B2
(45) Date of Patent: Sep. 2, 2003

(54) ANIMAL BEDDING AND METHOD FOR MAKING SAME

(75) Inventors: Barbara Isman, Winnipeg (CA); James Mowbray, Winnipeg (CA); Elizabeth Tokarchuk, Winnipeg (CA); Mikhail (Michael) Khavkine, Winnipeg (CA)

(73) Assignee: Cargill, Limited, Winnipeg (CA)

( * ) Notice: Subject to any disclaimer, the term of this patent is extended or adjusted under 35 U.S.C. 154(b) by 0 days.

(21) Appl. No.: 10/044,666

(22) Filed: Oct. 23, 2001

(65) Prior Publication Data

US 2003/0101940 A1 Jun. 5, 2003

Related U.S. Application Data (60) Provisional application No. 60/243,696, filed on Oct. 26, 2000.

(51) Int. Cl.[7] ............................................. A01K 29/00
(52) U.S. Cl. ....................................................... 119/171
(58) Field of Search ................................. 119/171, 172, 119/173

(56) References Cited

U.S. PATENT DOCUMENTS

| 3,872,545 | A |   | 3/1975  | Altosaar ..................... 19/26 |
|-----------|---|---|---------|--------------------------------------|
| 4,064,638 | A | * | 12/1977 | Stanfield .................... 34/174 |
| 4,201,835 | A |   | 5/1980  | Jellinek et al. ............. 428/288 |
| 4,847,095 | A |   | 7/1989  | Alley et al. .................. 426/2 |
| 5,053,235 | A |   | 10/1991 | Alley et al. ................. 426/74 |
| 5,152,251 | A |   | 10/1992 | Aukeman et al. ........... 119/171 |
| 5,347,950 | A |   | 9/1994  | Kasbo et al. ................ 119/171 |
| 5,466,188 | A | * | 11/1995 | Schaal et al. ................. 460/24 |
| 5,488,930 | A | * | 2/1996  | Kasbo et al. ............... 119/170 |
| 5,720,083 | A |   | 2/1998  | Leduc et al. ................... 19/30 |
| 5,891,937 | A |   | 4/1999  | Berg et al. .................... 524/13 |
| 5,906,030 | A |   | 5/1999  | Leduc et al. ................... 19/24 |
| 5,958,130 | A |   | 9/1999  | Stroeml et al. ............. 106/653 |
| 6,017,833 | A | * | 1/2000  | Reiner et al. ................ 442/408 |
| 6,079,647 | A | * | 6/2000  | Leduc et al. .................. 241/73 |
| 6,101,762 | A |   | 8/2000  | Courtabessis et al. ........... 47/9 |
| 6,114,416 | A | * | 9/2000  | Kolla et al. ..................... 524/9 |
| 6,133,348 | A | * | 10/2000 | Kolla et al. ..................... 524/9 |
| 6,357,083 | B1 | * | 3/2002 | Stratton et al. ................ 19/5 R |

FOREIGN PATENT DOCUMENTS

WO    WO 98/03705    1/1998

OTHER PUBLICATIONS

ECOlit LaLitiere de Lin des Champions, www.ecolit.com internet website information, 5 pages.

* cited by examiner

*Primary Examiner*—Thomas Price
(74) *Attorney, Agent, or Firm*—Fitch, Even, Tabin, & Flannery (57) ABSTRACT

The invention is an improved and environmentally-friendly animal bedding material, particularly useful as horse bedding. The bedding of the invention is generally non-irritating, substantially dust free flax shives which have an inner core and outer surface with sufficient inner core being exposed to make the bedding absorbent.

17 Claims, 7 Drawing Sheets

ANIMAL BEDDING AND METHOD FOR MAKING SAME

This application claims the benefit of U.S. Provisional Application No. 60/243,696, filed Oct. 26, 2000.

The invention is an improved and environmentally-friendly animal bedding material, particularly useful as horse bedding. The bedding of the invention is generally non-irritating, substantially dust free flax shives which have an inner core and outer surface with sufficient inner core being exposed to make the bedding absorbent.

BACKGROUND OF THE INVENTION

A number of different materials have been used as animal bedding, and in particular, horse bedding. Traditionally, horses and other animals have been bedded on straw. Despite its good availability, handling characteristics and disposability, straw has significant disadvantages, including low moisture absorbency, limited comfort for the animals, and high palatability that provokes herbivores to eat contaminated bedding. The low moisture absorption rate of straw bedding necessitates more frequent stall cleaning.

It has long been known that the bast fibers of various plant materials, e.g. flax, jute, hemp, ramie, kenaf, have particular utility in a wide variety of textile and, industrial uses. Accordingly, many different types of machines have been used to process the material for separating the bast fibers of the plant material from the woody portions thereof. For example, machines that utilize a scutching or beating or flailing action as the primary mechanism to break-up the woody material for dislodging it from associated fibers are well-known in the art.

The stalk of the flax plant has about 30–40% long outer bast fibers and 60–70% short woody inner core fibers or shives. The shives are left as a by-product when the flax material is processed to separate the fibers therefrom. Accordingly, the majority of the flax plant is left as a low-cost reject that is disposed of without any appreciable commercial gain such as by supplying it to farmers for livestock as an inefficient bedding, or for piling it along treelines as biomass to mix with soil and for stopping weed growth. In this regard, sale of shive material only takes in around $9 per ton or in otherwise burned as waste.

SUMMARY OF THE INVENTION

This invention relates to animal bedding material made from agri-by-products, such as flax shives, which are non-palatable for herbivores, including livestock and have a low composting rate. It is most particularly suited for use with horses and farm animals (livestock). The agri-by-products used in the invention are difficult to compost. Indeed, if these agri-by-products were not used in some fashion, they would be burned on the field contributing to Greenhouse gas emissions.

The flax shives which are included in the animal bedding composition of the invention have a specific particle size; are substantially without a residual seed content, which seed content (or lack thereof) will reduce the palatability of the shives to animals, e.g., herbivores and carnivores; and are substantially free of toxins, such as herbicides and pesticides; are substantially free of preservatives; and are substantially dust free. In general, the flax shives should have less than about 1 weight percent seeds, and in another aspect, less than 0.5 weight percent seeds.

Flax shives have a hydrophobic outer layer and porous inner core. The proportion of exposed inner core and outer surface of the shives used in the invention is carefully controlled to provide superior uniform water absorbency for the bedding composition. The absorbency is such that the bedding can absorb more than about 400 percent of its dry weight in water. The inner core of the shive is absorbent, hence, the amount of core that should be exposed to be effective for making the bedding absorbent, but sufficient skin or outer shive surface should remain to make the shives more durable to decomposition in the stall than cereal straw. In general the flax shives should have a length in the range of from about 0.2 to about 0.9 inches. Generally, the ratio of exposed inner shive core to outer surface of the shive particles ranges from about 4:1 to about 1:3. In another aspect this ratio is about 1:1.

The size and shape of each particle including length, width, and thickness is controlled to 0.2"–0.9", 0.01"–0.03", 0.01"–0.03", respectively.

In another aspect, the shives of the invention are mixed and compressed with non-palatable materials such as flax, hemp, kenaf, ramie, sisal straw, and mixtures thereof to make a combination bedding. In this aspect the shives constitute at least 50 weight percent of the bedding, but may form 100% of the bedding.

In yet another aspect, the invention provides a method of providing bedding for an animal comprising spreading the bedding composition on a substrate surface, such as a barn floor or the ground.

The value of the invention is evidenced by the fact that the bedding product converts an agricultural waste product into a useful animal bedding composition and thereby also reduces Greenhouse gas emissions into the atmosphere by preventing burning of the agricultural waste material.

DETAILED DESCRIPTION OF THE INVENTION

DEFINITIONS

"Flax" as referred to in the present application refers to plant fiber crops being grown either for seed (i.e. linseed oil) or for its fiber or for both. Examples of such crops include *Lignum usitatissimum* (common flax), *L. usitatissimum* album (white-flowered flax), and *L. usitatissimum* vulare (blue-flowered flax).

The high quality fibers of flax are from the stem of the plant and are in the phloem or bast, hence, flax is described as "bast fiber" crop. As used herein, "bast" refers to those fibers from the phloem region. Further, as used herein, flax "shives" refers to the core tissue particles that remain after bast fibers are separated from the flax stem. Flax shives include blends and mixtures of all cell types including vascular bundles and parenchyma cells.

Substantially dust free means less than about 0.05 weight percent of particles having a particle size of less than 100 microns.

Substantially free of toxins means less than 1 ppm on weight bases of material toxic to animals.

Substantially free of preservatives means the bedding of the invention does not include any added ingredient for preserving the bedding where the ingredient is in an amount effective for preserving the bedding.

Flax Shives Used in the Invention

The shives which are included in the bedding composition of the invention have a specific particle size, are substantially without a residual seed content which reduced seed content and will reduce the palatability of the shives to the animal. The shives used in the invention are substantially free of toxins, such as herbicides, pesticides and preservatives, such as creosol. The shives used in the invention are substantially dust free. In general the flax shives should have less than about 1 weight percent seeds, and in another aspect, less than 0.5 weight percent seeds. In general, toxins should constitute less than 1 ppm of the shives.

In general the flax shives should have a length in the range of from about 0.2 to about 0.9 inches. Generally, the ratio of exposed inner shive core to outer surface of the shive particles ranges from about 4:1 to about 1:3. As previously described in another aspect, this ratio is about 1:1.

Generally, flax shives (as opposed to bast fibers) is supplied as at least about 95 weight percent shives.

The morphological nature and chemical composition of the flax shive influences and contributes to the properties and performance of the animal bedding. Shives have a hydrophobic outer layer or skin and a porous inner core. The core and skin and the ratio of exposed core to skin is very important to the invention. Moreover the shives should not include too much bast fiber because bast fibers may cling into animals feet.

The flax shives should not have a mean particle size of more than about 0.5 inches in length, and in an important aspect, the shives have mean particle sizes of from about 0.4" to about 0.6" in length and in another aspect, not more than about 20 weight percent of the particles are smaller than 0.4". The shives used in the invention should have an average particle size distribution of from about 0.2" to about 0.3".

All chemical analyses and procedures were done according to the Technical Associate of the Pulp and Paper Industry (TAPPI) test methods as shown in Table 1. Flax shives used in the invention may be characterized chemically as set forth in Table 2. Generally, however, the shives used in the invention do not have more than about 24 weight percent lignin, and preferably less than about 20 weight percent lignin, and have more than about 70 weight percent polysaccharides.

TABLE 1

Chemical analysis and TAPPI test methods

| Chemical Analysis | TAPPI test methods |
|---|---|
| Moisture content | T 258 om-85 |
| pH of water extract | T 252 om-90 |
| Extractives | |
| Hot water | T 204 os-76 |
| Alcohol-benzene | T 204 os-76 |
| Acetone | T 204 os-76 |
| Di-chloromethane | T 204 os-76 |
| 1% sodium hydroxide | T 212 om-88 |
| Holocellulose | T 212 om-75 |
| α-cellulose | T 203 om-88 |
| Klason lignin | T 222 om-83 |
| Inorganic compounds | |
| Ash | T 211 om-85 |
| Silicates | T 245 om-88 |

TABLE 2

Chemical analysis of flax shives

| Composition | shive |
|---|---|
| Basic density, g/cm$^3$ | 1 to 1.2 |
| Moisture content, % | 7.5 |
| pH of water extract | 6.5 |
| Extractives | |
| Hot water, % | 4.4 |
| Alcohol-benzene, % | 2.1[0.1] |
| Acetone | 0.9 |
| Di-cholormethane | 2.1[0.1] |
| 1% NaOH, % | 28[1] |
| Holocellulose | |
| α-cellulose, % | 38.6 |
| β-cellulose % | 14.1[0.5] |
| γ-cellulose | 23.6[0.8] |
| Klason lignin, % | 19.0 |
| Inorganic materials | |
| Ash, % | 2.0[0.1] |
| Silicates, ppm | 737.5 |

Note: values for extractives are not additive.
[ ] - standard deviations

The absorbency of the animal bedding of the invention as compared to other known animal bedding is impressive as can be seen in the following example.

EXAMPLE I (Absorbency)

Moisture Absorption

Five 10 gram unused dry (room: 20° C.±1° C., 50% room humidity±5%) samples of each bedding type are used. Each sample is placed in a beaker and weighed. A measured quantity of water is added to the beaker until visually water is seen to pool on top. The bedding is allowed to soak for 60 min. All excess water is displaced by inverting the beaker through a strainer for 60 minutes. The volume of the recovered water is measured and the beaker re-weighed. The water absorption properties of the different bedding materials are calculated and expressed as percentage weight gain and water absorbed.

TABLE 1

Amount of water absorbed for each bedding type.

| Bedding | Water (ml) absorbed/bedding |
| --- | --- |
| Invention (a) | 4 |
| Invention (b) | 5 |
| Straw | 2 |
| Shavings | 3 |
| Peat | 3 |
| Hemp | 4 |
| Pellets | 7 |
| Paper | 10 |

TABLE 2

Percent weight increase for each bedding type.

| Bedding | Weight Increases % |
| --- | --- |
| Invention (a) | 410 |
| Invention (b) | 500 |
| Straw | 225 |
| Shavings | 254 |
| Peat | 300 |
| Hemp | 398 |
| Pellets | 750 |
| Paper | 900 |

EXAMPLE II (Dust Assessment)

Dust samples from bedding were examined microscopically and graded according to the following categories modified from Clarke and Madelin (Equine Vet. J 19(5), 442–447 (1987)):

I. "Very Good"—Negligible quantities of mold spores present, the principal dust constituents being plant hairs, pollen grains and other plant and miscellaneous fragments.

II. "Good"—Mold spores present, primarily of the large-spored, "field fungi" types, e.g., Alternaria sp., Cladosporium sps. Small numbers of respirable spores, such as Penicillium sp. and Aspergillus sp., in the 2 to 5 $\mu$m size range may be present. A lot of plant material present.

III. "Poor"—A large number of mold spores present, primarily of the large-spored, "field fungi" types, e.g., Alternaria sp., Cladosporium sp. Small numbers of respirable spores, such as Penicillium sp. and Aspergillus sp., in the 2 to 5 $\mu$m size range may be present. Samples with evidence of a small amount of dust mite infestation are also included in this category.

IV. "Very Poor"—Consists primarily of large numbers of respirable spores. Occasionally the major constituents are actinomycete spores of approximately 1 $\mu$m diameter. Samples with evidence of heavy dust mite infestation are also included in this category.

Results—Particle Identification

| Source | Particle types and assessment |
| --- | --- |
| Invention | Grade I |
| | Mainly plant particles present |
| Invention | Grade I |
| | Mainly plant particles present |

Particle identification of previously tested samples. (Note: assessment depends upon quality of individual samples analyzed).

| Source | Particle types and assessment |
| --- | --- |
| Straw | Grade III |
| | Large amount of "field fungi" spores |
| Shavings | Grade I |
| | Principally wood particles |
| Hemp | Grade II |
| | "field fungi" spores |
| Pellets | Range: Grade I–II |
| Paper | Range: Grade 1–III |

Making the Flax Shives Used in the Invention

Figure 1:
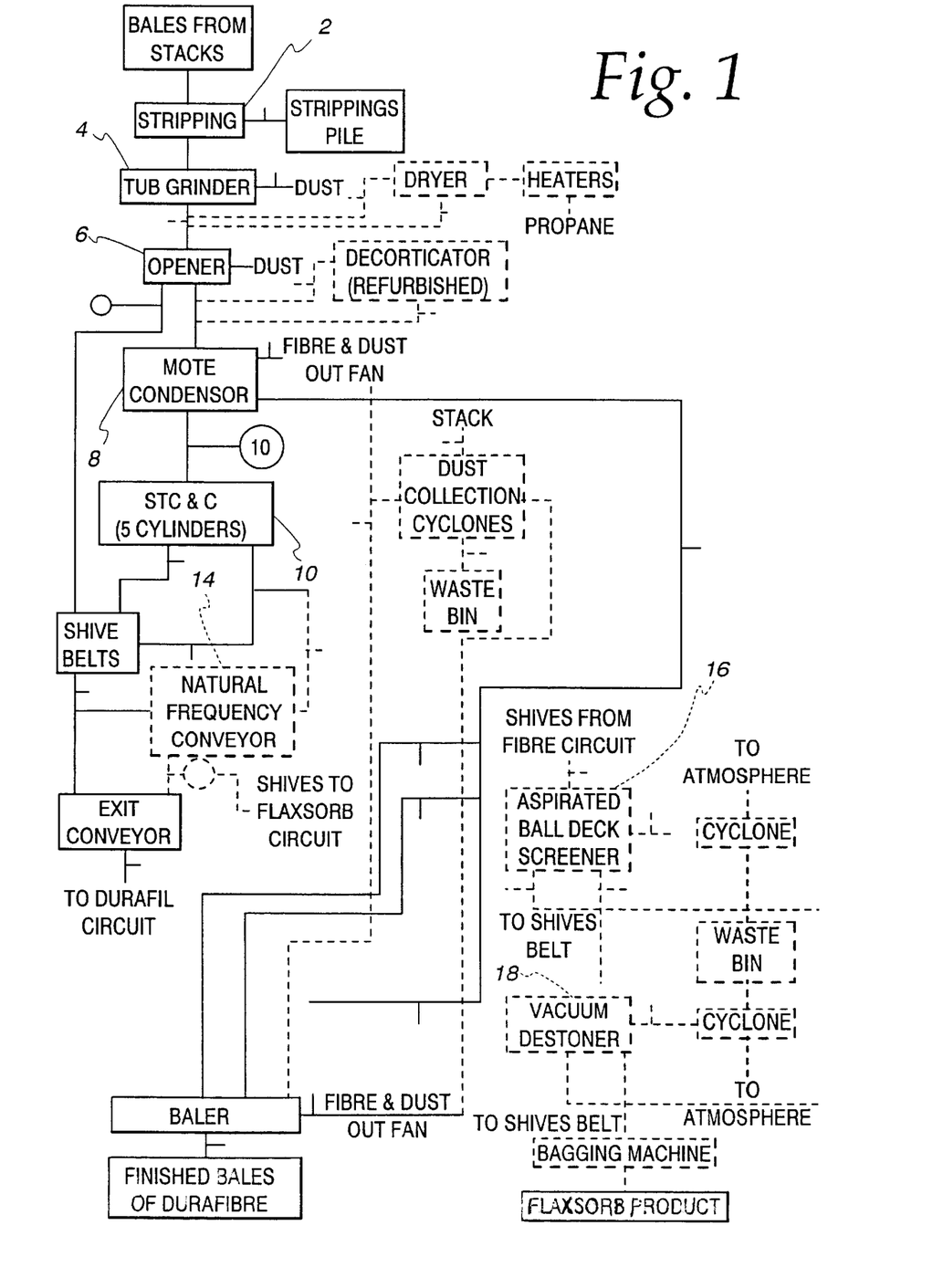
FIG. 1 is a schematic view of a plant material system for producing flax shives used in the invention.

The external portion of flax straw bales is manually stripped of wet sots and/or dirt as at 2. The remaining portion of the flax straw bale is fed into a tub grinder 4 for initial bale breaking, straw shortening and crude fibre/shive separation. The partially separated flax straw is fed, via mechanical conveyor, to a bale opener 6 (opener) that aids in pulling apart tangles in the material. The partially separated and de-tangled material is then moved by air to a mote condenser 8, the purpose of which is to remove dust and to create an even feed for the (STC&C) spiked tooth cylinder and concave system 10. The STC&C unit 10 includes spiked cylinders and concave members which further separate shives and fibres. This material is then moved mechanically to an elevator cleaner or "XL" cleaner 12 for additional shive/fibre separation The shive stream from the tub grinder, opener, mote condenser, the STC&C unit and XL cleaner may be used in the invention. A shive stream having an exposed core to outer surface ratio of about 1:1 to about 3:1 come from the STC&C unit and XL cleaner. The shive stream emanating from the tub grinder, opener and mote condenser has a ratio of exposed core to outer surface of about 4:1 to about 2:1.

All of the shive streams, plus fibre that has dropped out from the Opener, STC&C and XL Cleaners during the cleaning process are conveyed on belts to an open-mesh screen vibratory conveyor (or sieve) 14. The vibratory conveyor utilizes a shaking action to separate loose shives from fibre. The shives fall through the open-mesh screen and are carried mechanically to the top of an aspirated ball deck screener 16 that sorts shive particles into either one fraction of 0.2" to 0.9" in length or into two different fractions, of 0.5 to 0.9" in length and 0.2 to 0.6" in length. Air, generated by fans, is used to enhance particle movement and separation and to remove remaining dust. Dust may be removed using cyclones and fans. The shives are then sent to vacuum destoners 18 to remove the seeds therefrom. The de-dusted, destoned material is then fed, via auger, to a compression bagging machine. The product in the amounts of 50 lbs. is compacted to about 3.4 cubic feet.

Figure 2:
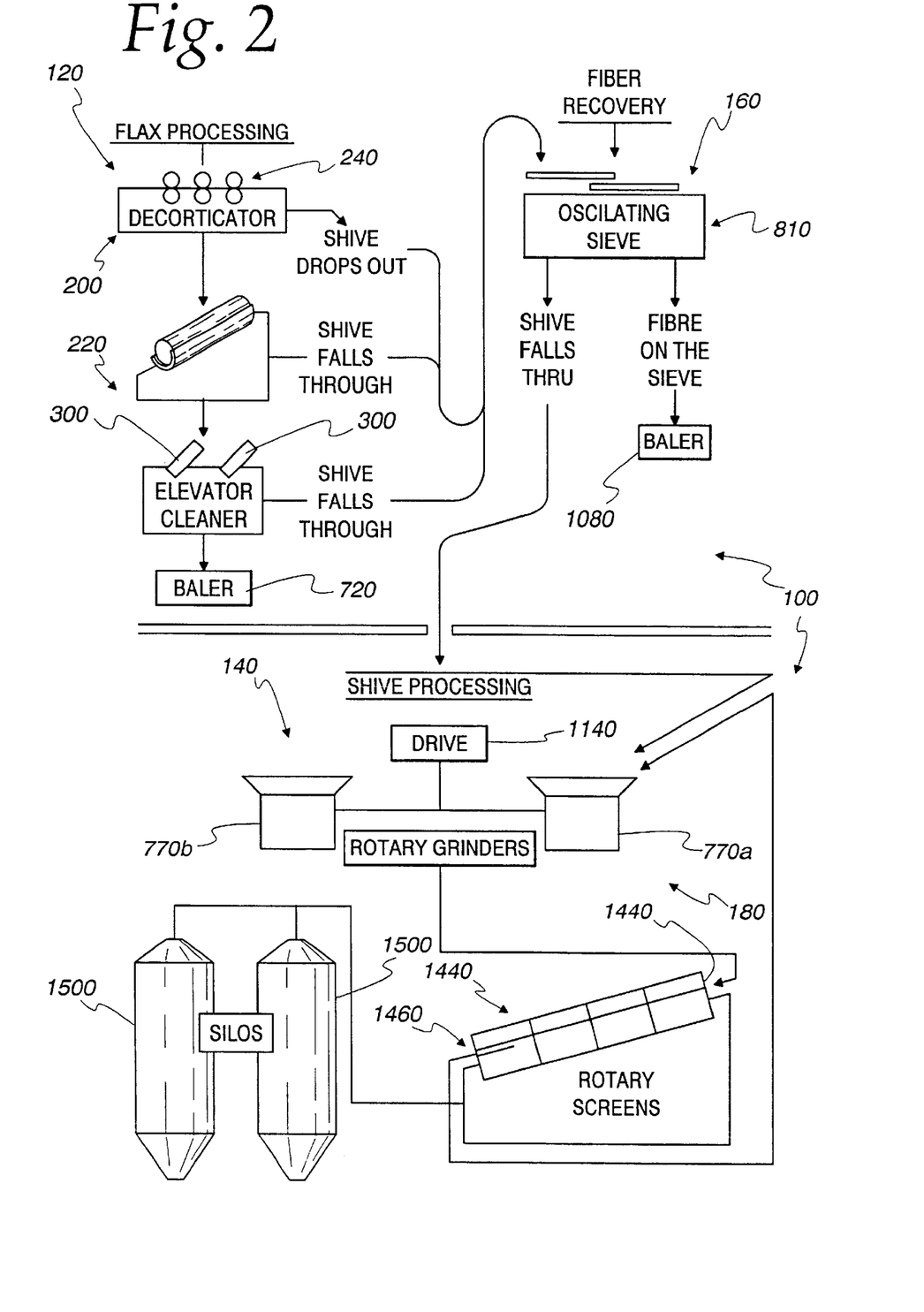
FIG. 2 is a schematic view of an alternate plant material processing system in accordance for producing flax shives and showing various processing sections thereof.

An example of an alternate process for the production of flax shives is described in U.S. Pat. No. 6,079,647, which issued Jun. 27, 2000, which is hereby incorporated by reference, and in PCT/CA97/00511, published on Jan. 29, 1998 as WO98/03705, which is also hereby incorporated by reference. This process, which will be more fully described below and as seen in FIG. 2 et seq., is probably more rigorous in separating bast from shives used in this invention and also recovering bast fiber than is required for producing the shives used in this invention. However, after the alternate process, the shive product must be subjected to removal of seeds, e.g., by treatment with vacuum destoners.

In one form as can be seen in FIG. 2, a processing system is provided having a plurality of processing sections which separate the shives or woody portions from fibers of plant material and for reducing the size of the separated woody portions. These processing sections include a stripping section for exerting a pulling action on the plant material to strip shive or woody portions therefrom while minimizing damage to and shortening of the fibers. Following the stripping section, a cleaning section is provided for separating the majority of the remaining shives or woody portions associated with the plant fibers by scraping of the plant material to obtain a further separation of the remaining woody material for yielding a product that has a very high fiber purity with the scraping action similar to the stripping action, doing minimal damage to the fiber length so that the fibers remain at a length that is commercially valuable.

Figures 3, 4:
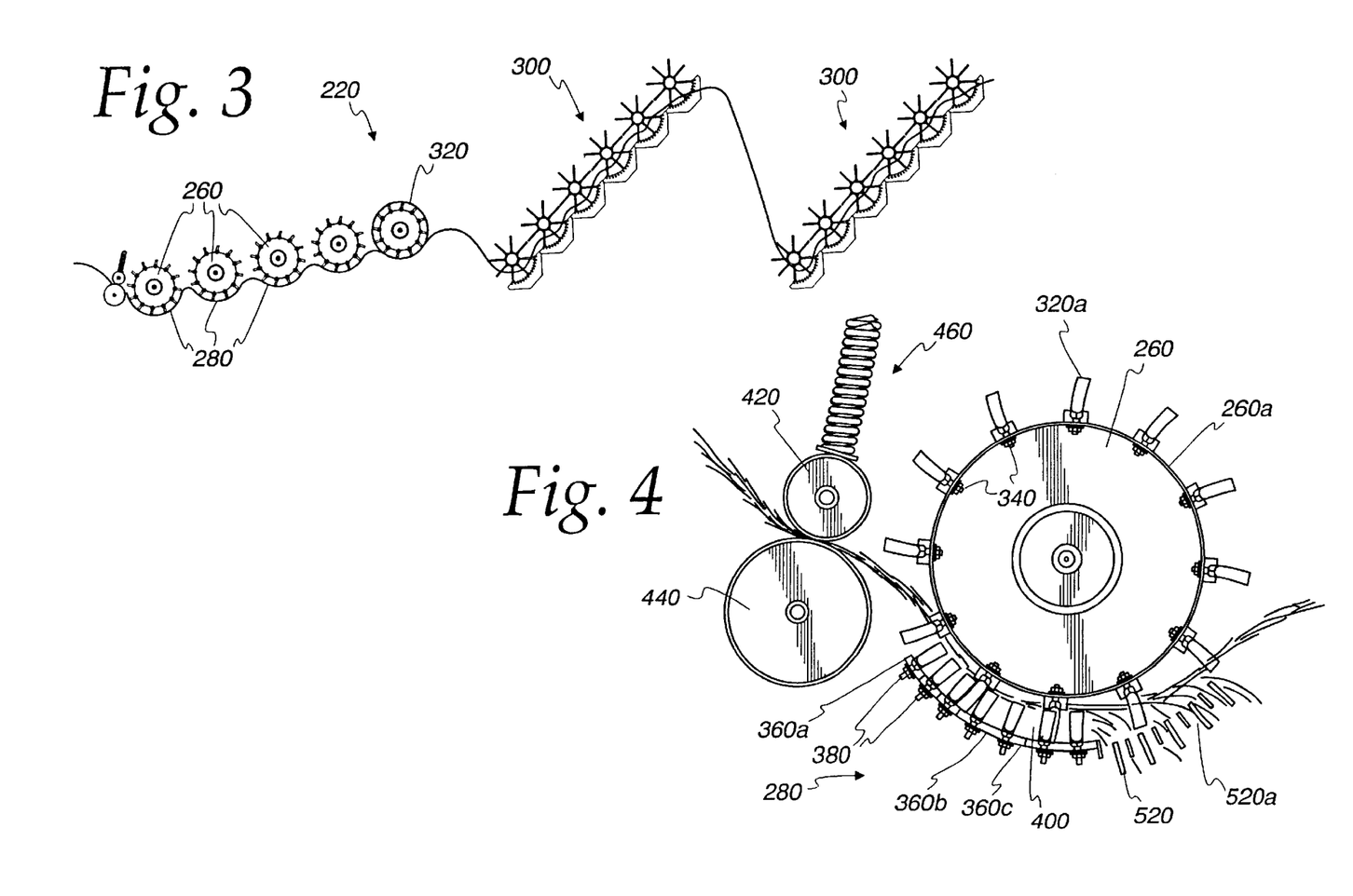
FIG. 3 is an elevational view showing five sets of spiked cylinders and concave members followed by a pair of elevator cleaners each including six sets of rotors having finger projections extending radially therefrom.
FIG. 4 is an enlarged elevational view of a pair of spring loaded mat forming rollers upstream from a set of a spiked cylinder and associated spiked concave member showing the spikes of the concave member arranged upstream from a downstream grated section thereof.
Figure 5:
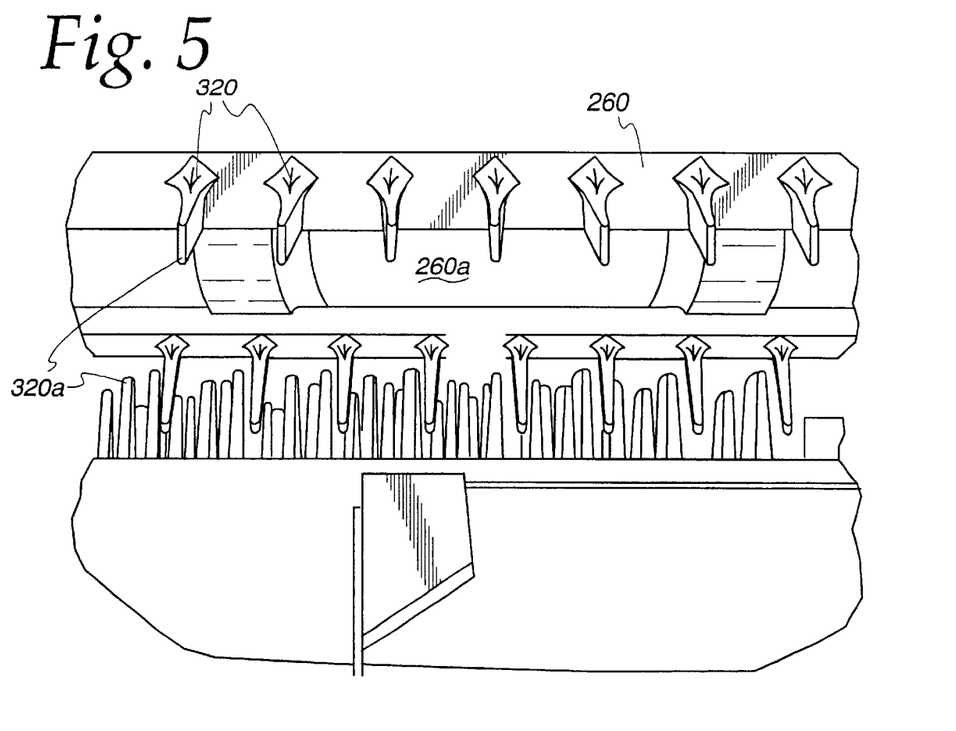
FIG. 5 is a front elevational view showing the spikes on the cylinder member arranged in axial rows with spikes in adjacent rows being offset from each other.
Figure 6:
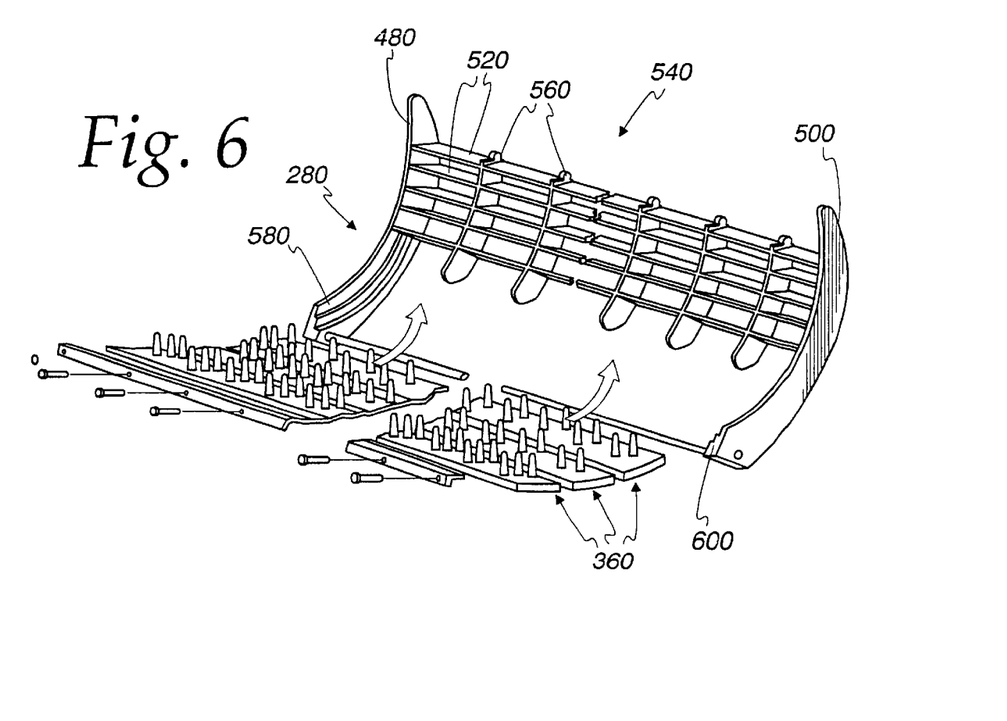
FIG. 6 is a perspective view of the concave member showing plates having the spikes in axial rows thereon with spikes in adjacent rows being offset from each other.

The alternate process system of FIG. 2 et seq. provides the provision of a cleaning apparatus for receiving decorticated plant material that has a first level of fiber purity, e.g. 55 to 60% fiber purity, and further separating remaining woody portions from fibers in the decorticated material to increase fiber purity to a second higher level of fiber purity, e.g. 90% fiber purity, over the first level. As seen in FIGS. 4–6, the apparatus includes at least one set of a cylinder and an associated concave member having a predetermined radial spacing therebetween and through which the plant material travels as the cylinder is rotated. Spikes are provided on the cylinder and the concave member that project generally radially therefrom and which are arranged so that the spikes overlap and are spaced laterally from each other as the cylinder is rotated and the spikes thereon pass the spikes on the concave member. Accordingly, as the cylinder spikes carry plant material past the concave member spikes, the material undergoes a scraping action to further remove any remaining woody portions from the fibers without substantial damage thereto. The spikes on the cylinder and the concave member are of a predetermined length that is slightly less than the predetermined radial spacing between the cylinder and concave member to minimize the radial clearance between the distal tips of the spikes and the cylinder and the concave member. By having the spikes extend to a depth close to the respective surfaces of the cylinder and the concave member, the amount of plant material in the lateral spaces between the respective spike members of the cylinder and the concave member undergoing the aforesaid scraping action is maximized.

Generally, there are five sets of cylinders and associated concave members provided through which the plant material travels.

The concave member can have a grated section that is downstream and circumferentially rearward of the concave member spikes in the plant material travel direction so that after the plant material carried by the cylinder spikes is subjected to the scraping action against the concave member spikes, the plant material travels over the grated section with scrapped off woody portions of the plant material passing through the grated section. The grated section has openings that are at a predetermined size selected to keep the longer fibers from passing through the openings while permitting the shorter scraped off woody portions to pass therethrough.

The processing equipment minimizes damage to the fibers so that they remain at a sufficient length for passing over the grated section, as otherwise proper sorting of fibers from separated woody portions will not occur potentially adversely affecting the subsequent processing of the plant material. Accordingly, the size of the grate openings is important for properly sorting the separated woody portions from the fibers for subsequent processing of the woody portions, as will be discussed more fully hereinafter. In this regard, the processing equipment utilized upstream from the cylinder and concave member keeps the fibers at a proper length so that the scraping action generated by the spikes of the cylinder and concave member do not shorten the fibers beyond their critical length for passing over the grated section.

The spikes of the cylinder and concave member generally are arranged in rows circumferentially spaced from one another with adjacent rows having spikes that are offset from each other so that the plant material is caused to undergo a back and forth scraping action as it is successively engages concave member spikes in different rows on either side of a particular cylinder spike. In this manner, the material is not continuously scraped along the same portion thereof throughout the spike overlap area and instead alternatively hits the offset spikes in different rows of the concave members at different times with different portions of the plant material to thereby minimize damage to the length of the fibers while still scraping off the woody portions therefrom.

The alternate method produces fibers from plant material by stripping woody material from fibers of the plant material to produce decorticated plant material at a first level of fiber purity, providing a plant material scraping area defined by cooperating spikes on a cylinder and associated concave member arranged in a set, feeding the decorticated plant material at the first level of fiber purity to the cylinder and concave member set, rotating the cylinder with the spikes thereon passing the spikes on the concave member with lateral spacing therebetween, carrying the decorticated plant material with the spikes on the cylinder to the scraping area by rotation of the cylinder, scraping woody portions of the plant material from the fibers as the plant material engages spikes on the concave member in the scraping area to minimize shortening of the fibers, and producing fibers at a higher level of purity than the first level after scraping and which are at a length that is only slightly shorter than the fibers fed to the scraping area.

The method may include arranging the spikes on the cylinder and concave member in circumferentially spaced axial rows with spikes in adjacent rows having spikes that are offset from each other, and causing the plant material to undergo a back and forth scraping action as the cylinder spikes carry plant material to the scraping area with the plant material successively engaging offset concave member spikes in different rows on the concave member on either side of a particular cylinder spike.

FIG. 2 depicts a plant processing system of the alternate method generally designated 100 which is designed to process very high-volumes of bast plant material, and preferably the flax straw that is grown in North America for its oilseed, to obtain the fibers therefrom at a commercially desirable length, and also to recover the shives. As shown, the plant or flax fiber processing system 100 includes a main flax fiber processing portion 120 of the system 100 which has processing sections with equipment that is designed to remove most of the fiber from the flax plant material. The flax processing portion 120 yields a product that has an approximately 90 percent fiber purity.

The processing system 100 also can include a woody or shive processing portion 140 for taking the shive separated in the flax fiber processing portion 120 and reducing its size to the size necessary for use in the invention. Further, a fiber recovery portion 160 can be provided preceding the shive recovery processing portion 140 for ensuring that substantially only shive material is fed to shive processing portion 140 and to retrieve any long fibers that may come out of stripping and cleaning sections, 200 and 220, respectively, of flax fiber processing portion 120 of the system 100. The flax fibers, recovered from the fiber recovery processing portion 160 are conveyed to a baler 1080 for being baled and stored. The shive that is sifted and falls through the baffles 1060 of the sieves 820 and 840 is conveyed to the grinding section 180 of the shive processing portion 140 of the processing system 100.

The shive processing portion 140 of the system 100 preferably utilizes a rotary grinder section 180, containing a pair of rotary grinders 770a and 770b to rapidly beat and grind the shive to a fine size. The grinders 770a and 770b are driven for high-speed rotation by a rotor drive 1140.

The shive processing portion of the system 100 can also be provided with a rotary screening section 1400 downstream from the second grinder 770b. The rotary screening section 1400 contains cylindrical screens (not shown) through which the processed shive is screened, entering through the upstream open end 1440 and exiting from the lower downstream end 1460. As shive particles sift through the screens, they fall into a hopper (not shown) and are conveyed into storage silos 1500. The shive material that is not sifted through the screens is recycled back to the rotary grinders 770a and 770b.

The stripping section 200 uses sets of fluted rollers 240 only shown schematically in FIG. 2 with sets rotating at progressively increasing operating speeds in the downstream direction. In this manner, a pulling action is exerted on the flax plant material which strips the shive therefrom with little damage caused to the fibers. The decorticating or stripping section 200 is effective to yield a product in the range of approximately 55–60 percent fiber purity and which is fed to the cleaning section 220 with the separated shives dropping out from the stripping section 200 between sets of rollers 240 for further processing.

The cleaning section 220 takes the product from the stripping section 200 and further purifies it to approximately 90 percent fiber purity, as previously-mentioned. To do this without causing substantial damage to the fibers, sets of cylinders 260 and associated concave members 280 are provided through which the plant material travels, and then to a pair of identical elevator cleaners 300. The cleaning section 220, and specifically the sets of cylinders 260 and associated concave members 280 are effective to scrape the flax as it is caused to travel therebetween against spikes 320 that are provided thereon. The scraping action is effective to separate the majority of the remainder of shives still attached to the flax fibers without too much shortening of the fibers.

Referring to FIGS. 4–6, the construction of the cleaning section 220 and particularly the cylinders 260 and concave members 280 thereof will next be described. The spikes 320 of the cylinder 260 are arranged in axial rows that are circumferentially spaced around the cylinder 260 and are fastened thereto as by a bolting arrangement 340. Similarly, the spikes 320 of the concave member 280 are arranged in axial rows that are circumferentially spaced from each other. The concave member spikes 320 can be secured to individual plates 360 as by a bolting arrangement 380. The cylinder 260 and associated concave member 280 are arranged at a predetermined radial spacing from one another with the spikes 320 being sized to extend radially so that distal tips 320a of the spikes only have a slight radial clearance from respective facing surfaces 260a and 280a of the cylinder 260 and concave member 280.

Scraping areas 400 are defined between the cylinders 260 and concave members 280 in which the overlapping spikes 320 thereof are disposed and through which the flax plant material is caused to travel by rotation of the cylinder 260. By having the spikes 320 extend to a depth close to the surfaces 260a and 280a of the respective cylinders and concave members 280 such that the overlap between the respective spikes 320 is maximized, the amount of plant material kept in the lateral spaces between the overlapping spikes 320 and undergoing the desired scraping action will also be maximized. By way of example, the spikes 320 can be approximately 3 to 3½ inches long with there being approximately a half inch clearance between the spike distal tips 320a and the surfaces 260a and 280a.

Before the flax material is fed to the first cylinder 260 and associated concave member 280, the flax is caused to travel through a pair of crush rollers 420 and 440 for forming a mat of flax material to be fed to the first scraping area 400 as carried by the spikes 320 on the cylinder 260 and to provide protection by removing foreign objects from the flax material. In this regard, the upper roller 320 can be spring loaded as by coil spring 460 so as to form a nip between the upper and lower rollers 420 and 440 through which the plant material is drawn.

For minimizing the damage done to the fibers of the flax material as it travels through the scraping areas 400, the spikes 320 on each of the cylinders 260 and concave members 280 are arranged such that spikes in one row are offset in an axial direction from spikes in an adjacent row. In this manner, as the cylinder 260 is rotated, the flax material carried by a cylinder spike 320 will be scraped against the closest concave member spike 320 immediately adjacent thereto on one lateral side thereof. Continued rotation of the cylinder 260 causes the plant material spaced farther away from the cylinder spike 320 that carries it on both sides of this cylinder spike 320 to be scraped against concave spikes 320 that are equally spaced slightly further apart on either side of the cylinder spike 320. Thereafter, plant material on the other side of the particular cylinder spike 320 will next scrape against the closest concave member spike 320 on that lateral side of the particular cylinder spike 320. Accordingly, at different times as the plant material is being pulled through the scraping area 400 by the cylinder spikes 320, the plant material on one side and/or the other of cylinder spike 320 and at different locations thereon will be undergoing a scraping action against an adjacent concave member spike 320 but not for the entire time the plant material is in the scraping area 400. In this manner, the plant material is caused to undergo a back and forth scraping action on either side of a particular cylinder spike 320 as it is pulled thereby through the scraping area 400.

Figure 7A:
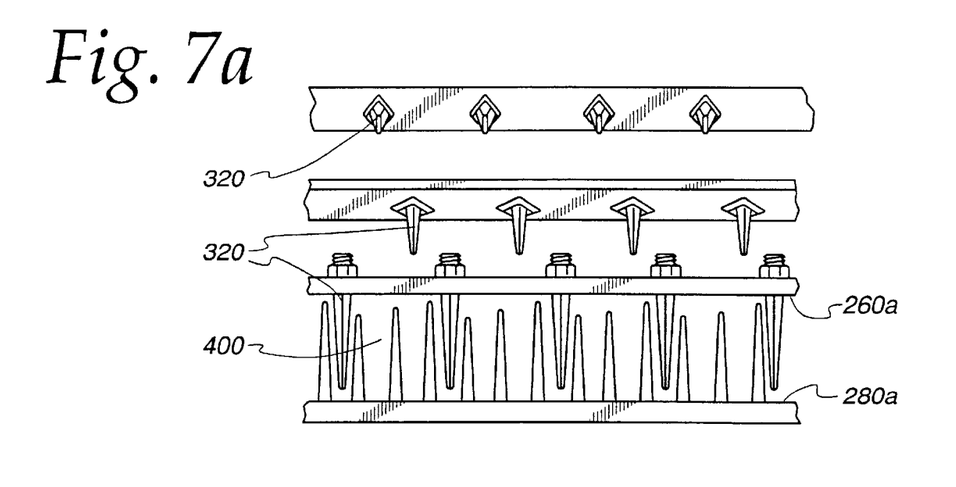
FIGS. 7a–7c are front elevational views showing successive rows of spikes on the cylinder member being rotated through a scraping area defined by the overlap between the spikes on the cylinder and concave member.
Figure 7B:
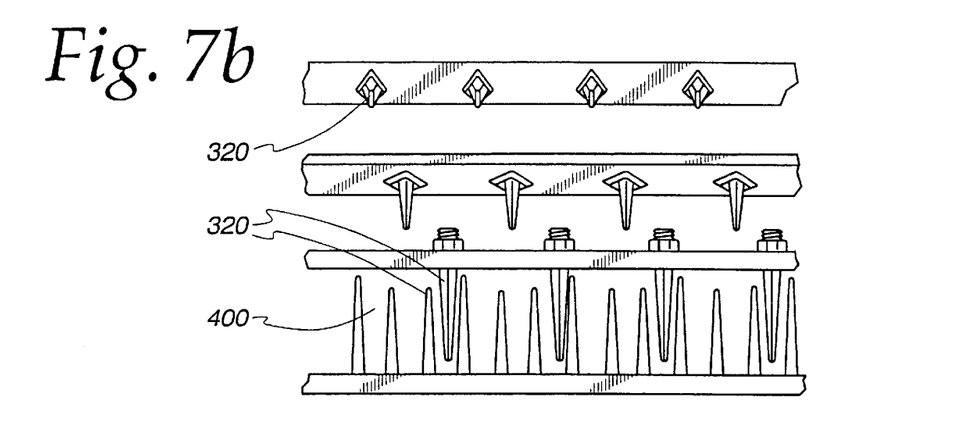
Figure 7C:
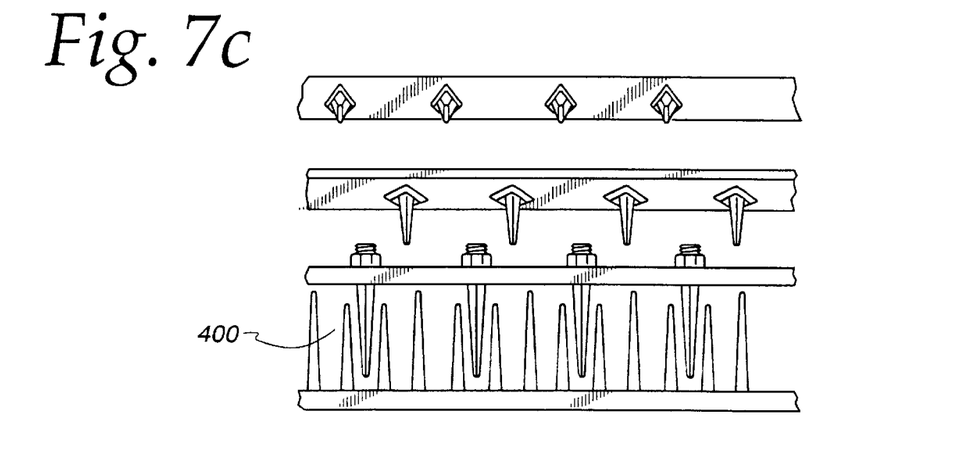

This arrangement of spikes 320 in the scraping area 400 can best be understood by reference to FIGS. 7a–7c. As can be seen in these figures, the spikes 320 have tapered side surfaces that converge at their distal tips 320a so that there is somewhat of a mating arrangement as cylinder spikes 320 are rotated through the scraping area 400 and past concave member spikes 320 on either side thereof. As shown, the cylinder axial rows of spikes 320 can repeat every fourth row in terms of the axial positioning of the spikes 320 in a row. The concave member spikes 320 can be similarly arranged in terms of their axial offset so that they repeat every fourth row. In this regard, FIGS. 7a–7c show variations in the height of adjacent concave member spikes 320 despite all of the concave member spikes 320 having the same radial length. The variations in height shown in 7a–7c are because of the different rows in which the spike members 320 are disposed on the concave member 280 with the spikes 320 that appear shorter in height being disposed in rows that are more circumferentially downstream from the taller appearing spikes 320. Accordingly, spikes 320 having the same height are all arranged in the same axially extending row. As such, it can be seen that the concave member spikes 320 like the cylinder spikes 320 repeat every fourth axial row in terms of their axial position within a row.

As previously discussed, the concave member spikes 320 are provided on individual plates 360. The plates 360 are adapted to be mounted to arcuate frame members 480 and 500. The concave member frames 480 and 500 are interconnected by transverse bars 520 which cooperate to form a grated section 540 that is circumferentially rearward or downstream from the concave member spikes 320 and the plates 360 to which they are mounted. The circumferential spacing of the transverse bars 520 of the grated section 540 is carefully selected so that the openings 520a formed therebetween are especially adapted for use in the flax processing system 100 herein. More specifically, the spacing 520a between the transverse bars 520 of the grated section 540 is selected to keep longer fibers that are scraped from the flax material in the scraping area 400 from falling through the openings 520a while permitting the shorter scraped off shive to fall therethrough. Preferably, the grate openings or spaces 520a between grate bars are sized to be on the order of approximately one half of an inch for the present processing system 100.

For providing strength to the grate bars 520 so they do not flex during operation of the system 100 herein and to assist in travel of the longer lighter fibers of the flax material over the grate bars 520, several circumferentially extending support or guide bars 560 can be attached between the bars 520 with the guide bars 560 being axially spaced from each other, as shown in FIG. 6. In this manner, the lighter fibers which tend to wad or clump together can more readily be pulled over the grated section 540 by the cylinder spikes 320 with the heavier pieces of shive separated from the fibers falling through the grate openings 520a between the grate bars 520, as shown in FIG. 4.

To mount the plates 360 with the concave member spikes 320 thereon, the frame members 480 and 500 have channel rails 580 and 600, respectively, formed on their facing inner sides so that the plates can be slid into position between the members 480 and 500 on the rails 580 and 600. In the preferred and illustrated form, three such plates 360 are provided with the first or upstream plate 360a having three rows of offset spikes 320 thereon and downstream plates 360b and 360c having two such offset rows of spikes 320 thereon. With the upstream plate 360a bolted or clamped in place relative to the frame members 480 and 500, the downstream plates 360b and 360c will be held and captured in place on the rails 580 and 600. Should less of a scraping action be desired, the scraping area 400 can be altered as by removing one of the plates 360 and replacing it with a blank, such as one of the plates 360 with the spikes 320 unbolted and removed therefrom. In this manner, the concave member 280 affords the option of adjusting the precise scraping action that the plant material undergoes in the scraping area 400.

The cleaning section 220 is provided with five sets of cylinders 260 and associated concave members 280 through which the plant material travels with downstream cylinders 260 and concave members 280 being slightly vertically higher than the preceding, upstream cylinder 260 and concave member 280, as can be seen in FIG. 3. The cylinder 260 is rotated at a predetermined speed that causes the material to travel through the scraping area 400 and out past the grated section 540 at a threshold speed that is sufficient to deliver it to the next cylinder 260 and associate concave member 280 downstream therefrom by the momentum imparted thereto by the immediately upstream cylinder 260. It has been found that rotation of the cylinder 260 at approximately 500 to 1100 rpms where the cylinder 260 is approximately 30 inches in diameter provides the material with sufficient momentum for being delivered to an adjacent downstream cylinder 260 while keeping a long fiber length and providing a high throughput for the large volume of flax material that the present system 100 is designed to process. The cylinder 260 and concave member 280 can be similar to that used in the 9600 John Deere combine used for processing rice with modifications as described above so that they are adapted for use in the present flax plant processing system 100, and particularly the flax fiber processing portion 120 thereof.

Figure 8:
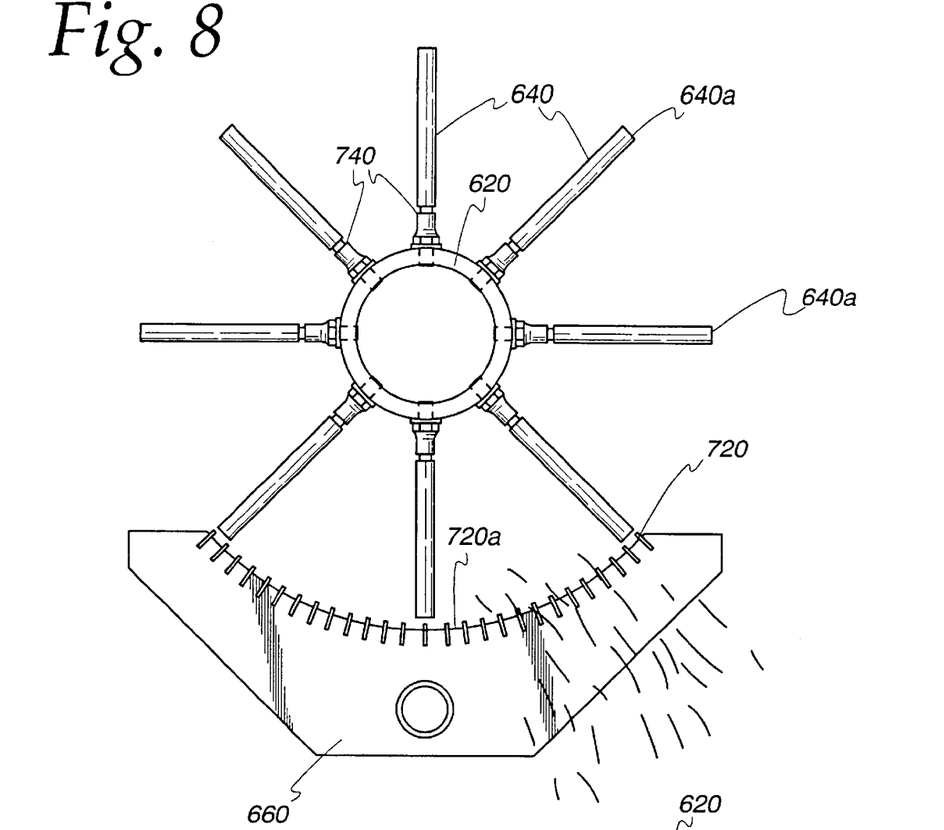
FIG. 8 is an elevational view of one of the rotors and its radial fingers and an associated concave grated member.
Figure 9:
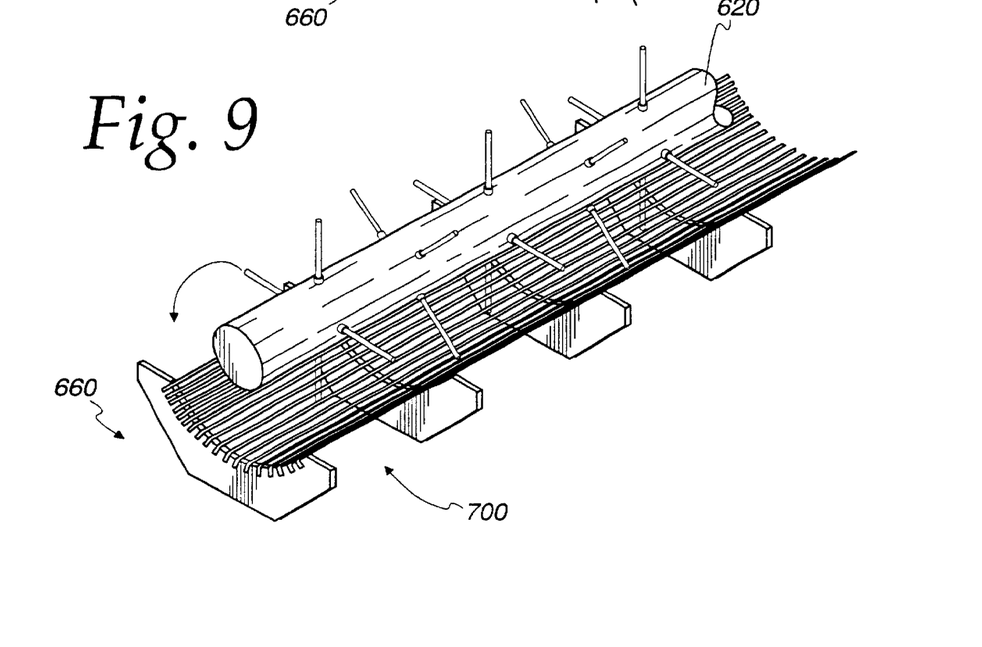
FIG. 9 is a perspective view of the rotor and concave member of the elevator cleaner showing the radial fingers arranged in axial rows with fingers in adjacent rows being offset from each other.

After the flax plant material has exited from the last set of cylinder 260 and associated concave member 280, it is fed to the pair of elevator cleaners 300 which exact a further separation of any loose shive pieces in the material that has been processed through the scraping areas 400. Each elevator cleaner 300 can include several rollers or rotors 620 which have very long radially extending fingers or rods 640 that are bolted or otherwise rigidly secured thereto and project radially therefrom so that there is only a slight clearance between their distal tips 640a and concave members 660 The concave members 660 each include a grated section 700 thereof formed by axially extending grate bars 720 that are circumferentially spaced to form grate openings 720a therebetween. Similar to the grated portion of the concave member 280, the grate openings 720a are sized to permit only the short shive pieces to pass therethrough with the longer fibers being carried by the fingers 640 for travel thereover. Generally, the grate openings or spaces 720a between grate bars 720 are sized to be on the order of approximately one half of an inch. The fingers 640 are arranged in axial rows with fingers 640 in adjacent rows being axially offset from each other. As shown, the rows of fingers 640 preferably repeat every other row. The fingers 640 act to pick the flax material and drag it over the grated section 700 thereby dislodging any loose shive from the longer plant fibers.

The fingers or rods 640 can be provided with an annular grove 740 adjacent their rigid attachment to the rotor 620. The grooves 740 allow the fingers 640 to break thereat if the fingers 640 encounter excessive force such as could occur if can excessive amount of flax fibers wad together. Instead of the wadded flax fibers being pushed against the concave grated section 700 and potentially bending and damaging this part of the elevator cleaner 300, the break-away grooves 740 cause failure in only the stressed fingers 640 which can be easily replaced versus the concave members 660. Further, this allows the elevator cleaner 300 to continue to function properly without varying the small radial clearance, e.g. on the order of 0.025 inches, through which the plant material travels.

As shown, each elevator cleaner 300 generally has six sets of rotors 620 and concave members 660 that are arranged at increasing vertical heights with respect to the immediately upstream rotors 620 and concave members 660 so that the elevator cleaner 300 causes the plant material to travel at a pitch of approximately 45.degree. upward until it exits therefrom. By way of example, the rotors 620 can have a 6⅝ inch diameter with the fingers 640 being approximately 8 inches long. To provide the flax material with sufficient momentum for feeding to an upstream rotor 620 and concave member 660, the rotors 620 can be rotated in the range of 100 to 700 rpms, and most preferably are rotated at approximately 500 rpms.

After the plant material has been processed through the cleaning section 220 including, the five sets of spiked cylinders 260 and associated concave members 280, and then the two elevator cleaners 300 each including six sets of rotors 620 and concave members 660, the product yielded therefrom will be at approximately 90 percent fiber purity while at the same time keeping the fiber length at the size necessary for commercial use despite the relatively tough and small size of the oilseed flax straw which the system 100 processes. After the fiber leaves the final downstream elevator cleaner 300, it is conveyed to a baler 760 where it is baled and stored.

Figure 10:
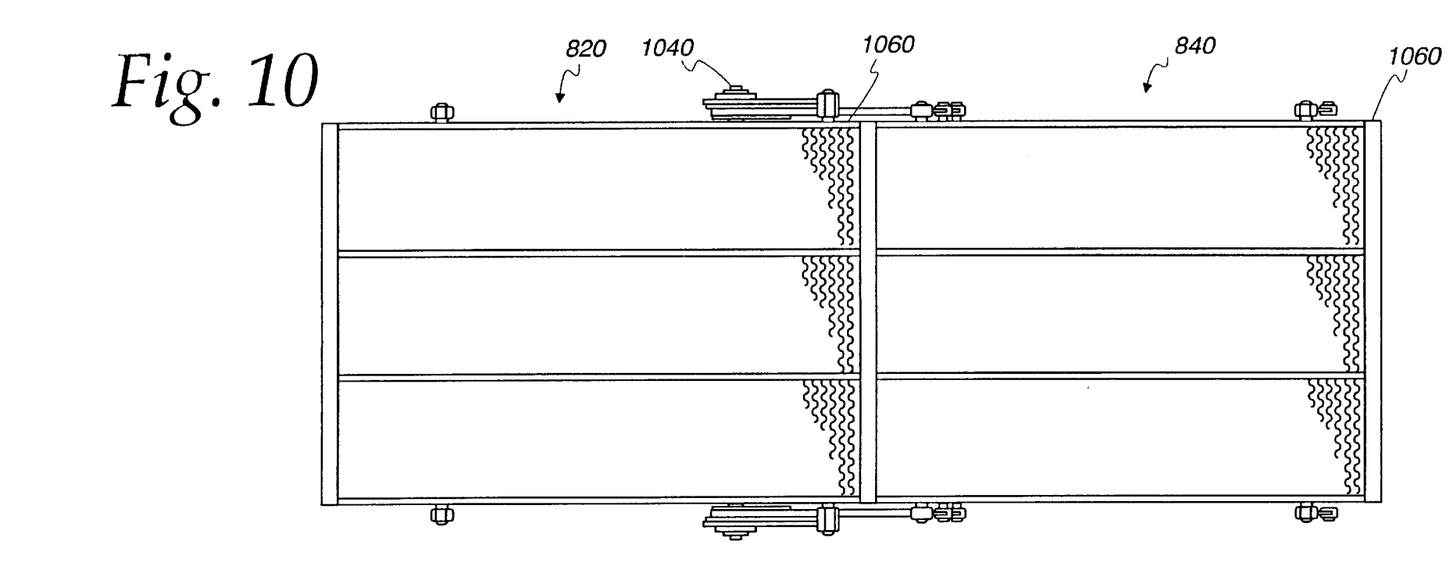
FIG. 10 is a top plan view of an oscillating sieve section of a fiber recovery portion of the plant material processing system.
Figure 11:
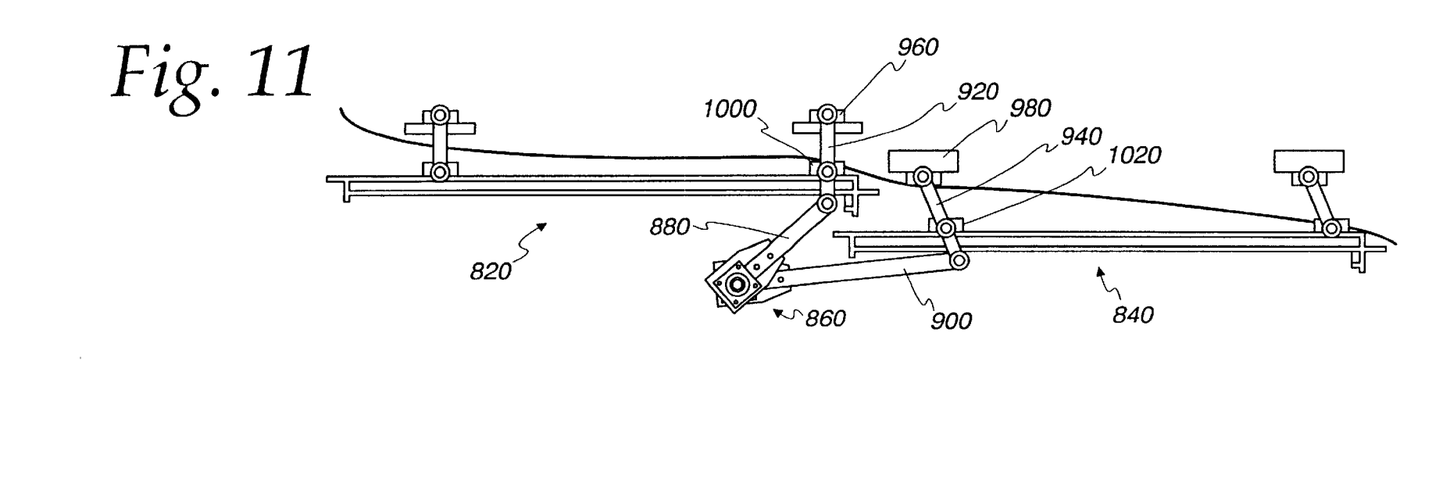
FIG. 11 is a side elevational view of the oscillating sieve section of FIG. 10 showing a pair of sieves and a drive mechanism for oscillating the sieves.

The fiber recovery portion 160 of the system 100 has a sieve section 810 utilizing a pair of oscillating sieves 820 and 840 (see FIGS. 10 and 11). Turning now to FIGS. 10 and 11, drive shaft 1040 of the drive mechanism 860 is connected to the pivot links 880 and 900 eccentrically so that it drives the pivot links 880 and 900 in an orbital back and forth path which causes the horizontal sieve 820 and 840 to oscillate both horizontally and vertically in a 2:1 ratio so that for every two inches the sieves 820 and 840 are caused to move horizontally, they are cause to move one inch vertically. The pivot links 880 and 900 are pivotally attached to respective pivot mounting bars 920 and 940 at one of the ends thereof with the mounting bars 920 and 940 being pivotally mounted to fixed mounting blocks 960 and 980 at their other ends for the sieves 820 and 840, respectively. The mounting bar 920 is fixed to the downstream end 1000 of sieve 820 intermediate pivotally mounted ends of the mounting bar 920. The mounting bar 940 is fixed to the upstream end 1020 of sieve 840 intermediate pivotally mounted ends of mounting bar 940. In addition, the oscillating movements of the sieves 820 and 840 are coordinated so that they move in equal and opposite directions at the same time such that if sieve 820 is moving back in an upstream direction, the sieve 840 is moving forward in a downstream direction; and if sieve 820 is moving vertically downward, sieve 840 is moving vertically upward. In a like manner, if the sieve 820 is moving in a downstream direction, the sieve 840 will be moving back in an upstream direction; and if sieve 820 is moving vertically upward, the sieve 840 will be undergoing a vertically downward motion. The opposite oscillating movements of the sieves 820 and 840 tend to cancel out one another in terms of the momentum imparted to the plant material thereon thus keeping it on the screen surfaces of the sieves 820 and 840 for a longer period of time for screening out the heavier shive in the flax plant material through the sieves 820 and 840 as they are being oscillated. In this manner, the oppositely oscillating sieves 820 and 840 serve to shake loose the separated shive material from the flax fibers which tend to clump together as a consequence of the shaking action and thus will not fall through the sieves 820 and 840 so that substantially only shive is delivered to shive processing portion 140 of the present flax processing system 100.

What is claimed is:

1. An animal bedding composition comprising:
    flax shives having a length of from about 0.2 to about 0.9 inches, the shives having an inner core and outer surface, the inner core of the shives being exposed to effect absorbency to the bedding, the flax shives having a residual seed content of not more than about 1 weight percent.

2. The animal bedding composition as recited in claim 1 wherein the ratio of exposed inner core to outer surface of the flax shive is in the range of about 4:1 to about 1:3.

3. The animal bedding composition as recited in claim 1 wherein the ratio of exposed inner core to outer surface of the flax shives is about 1:1.

4. The animal bedding composition as recited in claim 1 wherein the flax shives have a length and width, the length and width having a ratio in the range of about 6:1 to about 25:1.

5. The animal bedding composition as recited in claim 1 wherein bedding further comprises non-palatable material selected from the group consisting of flax, hemp, kenaf, ramie, sisal straw and mixtures thereof.

6. The animal bedding composition as recited in claim 1 wherein the bedding is substantially free of preservatives.

7. The animal bedding composition as recited in claim 1 wherein the flax shives have a average particle length in the range of from about 0.4" to about 0.6".

8. A animal bedding composition comprising:
    flax shives having a length of from about 0.2 to about 0.9 inches, the shives having an inner core and outer surface, the inner core of the shives being exposed to effect absorbency to the bedding, the flax shives having a residual seed content of not more than about 1 weight percent, the ratio of exposed inner core to outer surface of the flax shive being in the range of about 4:1 to about 1:3 and the flax shives having an average particle length in the range of from about 0.4" to about 0.6".

9. The animal bedding composition of claim 1 wherein the bedding is substantially free of preservatives.

10. A method for providing bedding for an animal on a substrate surface, the method comprising:
    spreading a shive bedding composition on the substrate surface, the shive bedding composition comprising:
    flax shives having a length of from about 0.2 to about 0.9 inches, the shives having an inner core and outer surface, the inner core of the shives being exposed to effect absorbency to the bedding, the flax shives having a residual seed content of not more than about 1 weight percent.

11. The method for providing bedding for an animal as recited in claim 10 wherein the ratio of exposed inner core to outer surface of the flax shive is in the range of about 4:1 to about 1:3.

12. The method for providing bedding for an animal as recited in claim 10 wherein the ratio of exposed inner core to outer surface of the flax shives is about 1:1.

13. The method for providing bedding for an animal as recited in claim 10 wherein the flax shives have a length and width, the length and width having a ratio in the range of about 6:1 to about 25:1.

14. The method for providing bedding for an animal as recited in claim 10 wherein the bedding further comprises non-palatable material selected from the group consisting of flax, hemp, kenaf, ramie, sisal straw and mixtures thereof.

15. The method for providing bedding for an animal as recited in claim 10 wherein the flax shives have a average particle length in the range of from about 0.4" to about 0.6".

16. A method for making an animal bedding composition, the method comprising:

separating flax shives and bast fibers to provide at least about 95 percent flax shives;

removing dust from the flax shives; and removing seeds from the flax shives to provide a shive product which has an outer layer and core, the shive product having a ratio of exposed core to outer layer in the range from about 4:1 to about 1:3.

17. The method as recited in claim 16 wherein seeds are removed to provide an animal bedding composition with less than about 1 weight percent seeds.

\* \* \* \* \*